Patented Oct. 11, 1932

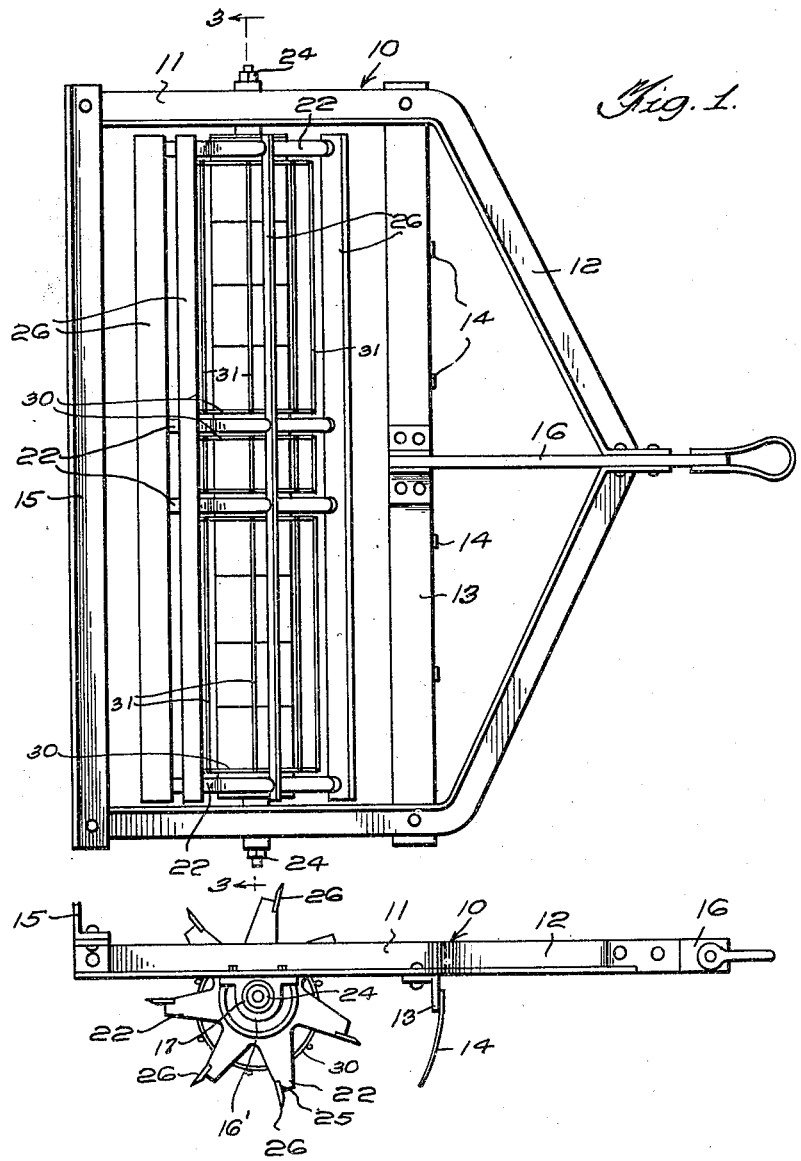

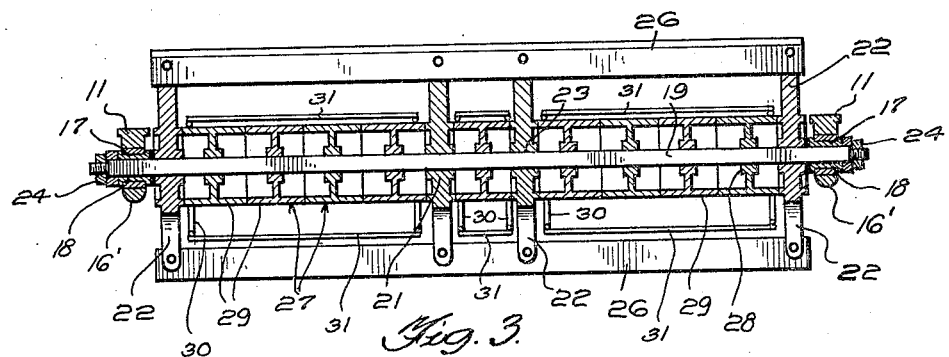
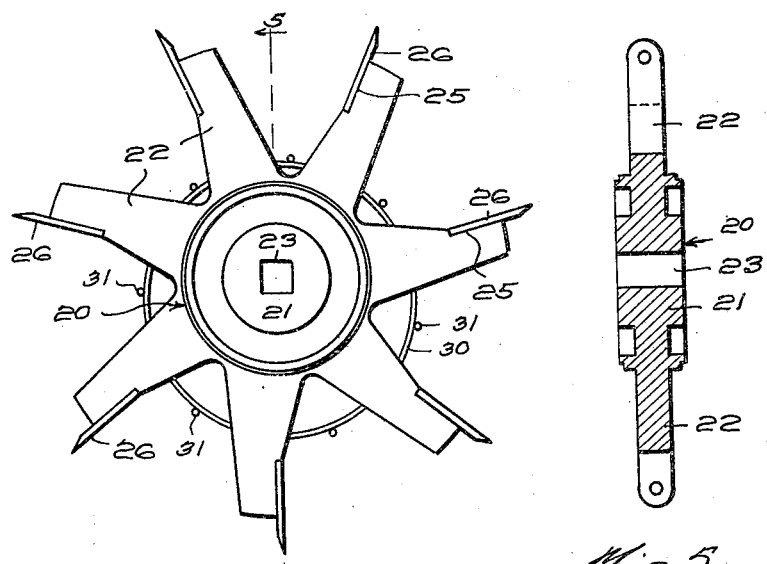

1,882,272

UNITED STATES PATENT OFFICE

EDWARD L. CALDWELL, OF CORPUS CHRISTI, TEXAS, ASSIGNOR TO CALDWELL CYPRESS CISTERN CO., INC., OF CORPUS CHRISTI, TEXAS, A CORPORATION OF TEXAS

STALK CUTTER

Application filed July 30, 1931. Serial No. 554,094.

My invention relates to improvements in stalk cutters.

An important object of the invention is to provide means to knock down stalks upon the ground so that they may be properly engaged by a rotatable cutting element which rolls over the ground.

A further object of the invention is to provide means to gather the knocked down stalks to the center of the row so that they will be in a proper position for engagement with the rotatable cutting element.

A further object of the invention is to provide a cutting element, all parts of which are assembled upon a single rod, held thereon in a manner so that these parts may be readily removed and replaced when desired.

A further object of the invention is to provide elements which serve as spacers and weights, upon the rotatable cutting element, whereby sufficient weight is provided for varying cutting conditions.

A further object of the invention is to provide means for discharging loose stalks, dirt or the like, from between the blades of the rotatable cutting element.

Other objects and advantages of the invention will be apparent during the course of the following description.

In the accompanying drawings forming a part of this specification and in which like numerals are employed to designate like parts throughout the same,—

Figure 1 is a plan view of a stalk cutter embodying my invention;

Figure 2 is a side elevation of the same;

Figure 3 is a central vertical longitudinal section through the rotatable cutting element, taken on line 3—3 of Fig. 1;

Figure 4 is an end elevation of the rotatable cutting element; and

Figure 5 is a transverse section through one of the spiders included in the rotatable cutting element, taken on line 5—5 of Fig. 4.

The frame of the stalk cutter is designated as a whole by the numeral 10, and includes an angle iron bent to provide parallel sides 11, and forwardly converging portions 12. The sides 11 are rigidly connected at their forward ends by a stalk knocking down element 13, preferably in the form of an angle iron, as shown. Depending blades 14, preferably suitably resilient, are attached to the forward side of the angle iron 13 and are arranged in pairs upon opposite sides of the central longitudinal axis of the frame 10. The purpose of these blades 14 is to gather the stalks between them to the center of the row, the present machine being designed for cutting two rows of stalks at one time, although the machine may be constructed to cut any suitable number of rows, as desired. The rear ends of the sides 11 are rigidly connected by an angle iron 15, rigidly attached thereto and arranged upon the top of the sides 11 at a suitable elevation to permit of proper discharge of the cut stalks.

A draft appliance is provided including a bar 16, the rear end of which is attached to the angle iron 13 and the forward end of which is arranged between the forwardly converging portions 12 of the frame 10 and are rigidly secured thereto by any suitable means.

Arranged beneath the sides 11 and rigidly secured thereto are bearings 16', rotatably receiving cylindrical bearing sleeves 17, having central openings 18, which are square in cross section.

The rotatable cutting element embodies a single rod 19, which is square in cross section, and the opposite ends of which are adapted to be inserted within the openings 18 of the bearing sleeves. Mounted upon the rod 19 are spiders 20, including hubs 21, carrying radial arms 22. These hubs have openings 23 which are square in cross section to receive the rod 19. Any suitable number of these spiders may be employed depending upon the number of rows of stalks to be cut at one time, and in the present illustration, the rotatable cutting element is designed to cut two rows at one time, and hence a pair of spiders 21 is disposed at the ends of the cutting element and a pair near the center, as shown. The bearing sleeves 18 have their inner ends slidably contacting with the outer faces of the hubs 20, and the ends of the rod 19 are screw threaded for receiving nuts 24, which serve to press these bearing sleeves up against the outer faces of the hubs 21. The arms 22 are provided upon their forward sides with recesses 25 to receive blades 26, detachably clamped thereto by screws or the like. These blades are preferably straight and are radially disposed and have their outer edges sharp, as shown.

The numeral 27 designates combined spacing elements and weights, each of which includes a hub 28 having a square opening to receive the rod 19, and this element further includes a cylindrical periphery 29. The several elements 27 are assembled so that the elements in each set have their cylindrical peripheries 29 arranged in end to end contacting relation, with the outermost elements 27 contacting with the hubs 21, as shown. One element 27 is arranged between the inner pair of spiders 20, and contact with the hubs of same. The elements 27 serve as means to retain the spiders suitably spaced, which are not otherwise clamped to the rod 19 and also serve as weights to provide suitable downward pressure to cause the cutting element to properly cut the stalks. The elements 27 are readily removable from the shaft 29 so that similar elements of different weight may be substituted therefor, to meet different cutting conditions.

Particular attention is called to the fact that the combined spacing elements and weights 27 are of suitable diameter whereby a sufficient space of clearance is provided radially between them and the inner edges of the blades 26, whereby the cut stalks, trash or the like can properly fall out of the rotatable cutting element.

Means are provided for discharging the cut stalks, dirt or the like from between the blades 26, including a plurality of rings 30, loosely mounted upon selected elements 27 and having substantially larger diameters than these elements 27. These rings are free to roll upon the elements 27. The rings are connected by rods 31, rigidly secured thereto by any suitable means. These rods are parallel with the blades 26, as shown. As the cutting element rotates, the loose stalks and dirt upon the ground press the rings and their connecting rods upwardly, thereby forcing from between the blades 26 cut stalks or dirt accumulating within the upper portion of the cutting element. As the cutting element rotates, the upper raised portions of the rings may be lowered and again forced upwardly, thus continuing the action of removing the cut stalks, trash or the like from between the blades of the rotatable cutting element.

When it is desired to remove the combined spacing elements and weights 27, for substitution or the like, the nuts 24 are removed from the ends of the rod 19 and this will permit of the longitudinal movement of the rod 19 from within the hubs of the spiders and elements 27 and also from within the bearing sleeves 18. The reverse of this operation is employed in assembling these elements.

In operation, the stalk cutter is drawn forwardly over the rows of stalks, two rows being cut with the machine illustrated, and the stalks in these rows are first knocked down by the angle iron 16 and are gathered to the center of the rows by the blades 14. The cutting element rolls upon the ground and constitutes the entire support of the frame 10 and its blades 26 engage with the knocked down stalk and cut the same off.

It is to be understood that the form of my invention here shown and described is to be taken as a preferred embodiment of same, and that various changes in the shape, size and arrangement of parts may be resorted to without departing from the spirit of my invention or the scope of the subjoined claims.

Having thus described my invention, what I claim, is:

1. In a stalk cutter, a frame, a rotatable cutting element mounted upon the frame and projecting downwardly below the same, said cutting implement including blades, an element secured to the frame in advance of the rotatable cutting element and serving to knock down the stalks, and blades secured to said element and serving to gather the knocked-down stalks to the center of the row or rows, and means for discharging material from between the blades, said means being loosely mounted upon the cutting element inwardly of the blades to be gravity operated.

2. In a stalk cutter, a frame, a rotatable cutting element mounted upon the frame, including a rod mounted upon the frame in a manner to be removed therefrom by a longitudinal movement of said rod, spaced spiders mounted upon the rod, combined spacing elements and weights mounted upon the rod between the spiders, and blades connecting the spiders, the rod being slidable longitudinally with relation to the spiders and combined spacing elements and weights.

3. In a stalk cutter, a frame, a rotatable cutting element mounted upon the frame including a rod, spiders mounted upon the rod in spaced relation, combined spacing elements and weights mounted upon the rod between the spiders, rings loosely mounted upon the combined spacing elements and weights, rods connecting the rings, and blades mounted upon the outer portions of the spiders.

4. In a stalk cutter, a frame, bearings secured to the frame, bearing sleeves for insertion within the bearings and having square openings, a rod which is square in cross section adapted for insertion within the square openings of the bearing sleeves, nuts carried by the ends of the rods and engaging the ends of the bearing sleeves, spiders having hubs provided with openings which are square in cross section for receiving the rod, combined spacing elements and weights having hubs provided with openings which are square in cross section to receive the rods, and blades secured to the outer portions of the spiders.

In testimony whereof I affix my signature.

EDWARD L. CALDWELL.